US012643479B2

(12) United States Patent
Glickman et al.

(10) Patent No.: US 12,643,479 B2
(45) Date of Patent: Jun. 2, 2026

(54) SYSTEMS FOR ACCESSING CARGO SPACES ON VEHICLES EQUIPPED WITH A TAILGATE ASSEMBLY THAT INCLUDES A DOOR SUBASSEMBLY

(71) Applicant: FORD GLOBAL TECHNOLOGIES, LLC, Dearborn, MI (US)

(72) Inventors: David Brian Glickman, Southfield, MI (US); Stuart C. Salter, White Lake, MI (US); Nadia Preston, Tecumseh (CA); Dennis Yee, Milford, MI (US); Joshua Robert Hemphill, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 5 days.

(21) Appl. No.: 18/785,628

(22) Filed: Jul. 26, 2024

(65) Prior Publication Data

US 2024/0383408 A1      Nov. 21, 2024

Related U.S. Application Data

(62) Division of application No. 17/223,488, filed on Apr. 6, 2021, now Pat. No. 12,071,102.

(51) Int. Cl.
| | |
|---|---|
| *B60R 3/02* | (2006.01) |
| *B62D 33/027* | (2006.01) |
| *G01L 1/22* | (2006.01) |

(52) U.S. Cl.
CPC ............ *B60R 3/02* (2013.01); *B62D 33/0273* (2013.01); *G01L 1/225* (2013.01)

(58) Field of Classification Search
CPC .............................. B60R 3/02; B62D 33/0273
See application file for complete search history.

(56) References Cited

U.S. PATENT DOCUMENTS

| | | | | |
|---|---|---|---|---|
| 4,194,754 A | * | 3/1980 | Hightower | B60R 3/02 280/166 |
| 4,198,070 A | * | 4/1980 | Weiler | B60R 3/02 280/166 |
| 5,678,872 A | * | 10/1997 | Slater | B60R 19/48 293/118 |
| 5,738,362 A | * | 4/1998 | Ludwick | B60R 3/02 280/166 |
| 6,145,865 A | * | 11/2000 | Cannara | B60D 1/60 280/491.1 |

(Continued)

FOREIGN PATENT DOCUMENTS

KR          101735802 B1      5/2017

*Primary Examiner* — Jeffrey J Restifo
(74) *Attorney, Agent, or Firm* — Vichit Chea; Carlson, Gaskey & Olds, P.C.

(57)                ABSTRACT

Vehicle systems for accessing and utilizing vehicle cargo spaces on vehicles equipped with a tailgate assembly having a door subassembly may include deployable step systems, deployable lift panel systems, deployable cargo extender systems, etc. The vehicle systems may be either separate from or integrated with the door subassembly of the tailgate assembly. An exemplary vehicle system may include a deployable step that is movable between a stowed position and a deployed position in order to present a step surface to a user for accessing the vehicle cargo space.

20 Claims, 9 Drawing Sheets

(56) References Cited

U.S. PATENT DOCUMENTS

| | | | | |
|---|---|---|---|---|
| 6,170,843 | B1 * | 1/2001 | Maxwell | B60R 3/02 |
| | | | | 280/166 |
| 6,530,588 | B1 * | 3/2003 | Varney | B60R 3/02 |
| | | | | 280/505 |
| 6,682,086 | B1 * | 1/2004 | Erickson | B60R 3/02 |
| | | | | 280/166 |
| 6,685,204 | B1 * | 2/2004 | Hehr | B60R 3/02 |
| | | | | 280/166 |
| 6,918,624 | B2 * | 7/2005 | Miller | B62D 33/037 |
| | | | | 182/127 |
| 6,942,272 | B2 * | 9/2005 | Livingston | B62D 33/027 |
| | | | | 296/57.1 |
| 7,434,825 | B2 * | 10/2008 | Williams | B60R 3/02 |
| | | | | 280/166 |
| 7,661,693 | B1 * | 2/2010 | Lipski | B60R 9/06 |
| | | | | 280/166 |
| 8,919,853 | B2 * | 12/2014 | Krishnan | B60R 3/02 |
| | | | | 296/62 |
| 9,302,719 | B1 * | 4/2016 | Krishnan | B60R 3/02 |
| 9,487,147 | B1 * | 11/2016 | Morrill | B60D 1/58 |
| 9,889,782 | B2 * | 2/2018 | Gobart | B60N 3/02 |
| 10,005,396 | B2 * | 6/2018 | Spahn | B60R 3/02 |
| 10,086,775 | B2 * | 10/2018 | Spahn | B60R 11/06 |
| 10,106,087 | B2 * | 10/2018 | Stojkovic | B60P 3/14 |
| 10,131,384 | B2 * | 11/2018 | Raines | B60P 3/40 |
| 10,183,623 | B2 * | 1/2019 | Krishnan | B60R 3/02 |
| 10,464,618 | B2 * | 11/2019 | Loew | B60R 3/02 |
| 10,543,789 | B1 * | 1/2020 | Hemphill | B62D 33/037 |
| 10,562,456 | B2 * | 2/2020 | Lynch | B60R 3/02 |
| 10,661,842 | B2 * | 5/2020 | Povinelli | B62D 33/03 |
| 10,927,581 | B2 * | 2/2021 | Nania | E05F 15/614 |
| 10,994,660 | B2 * | 5/2021 | Ngo | B62D 33/0273 |
| 11,208,157 | B2 * | 12/2021 | Borkar | B62D 33/037 |
| 11,299,097 | B1 * | 4/2022 | McCready | B60R 3/02 |
| 11,325,451 | B2 * | 5/2022 | Nania | B60R 3/02 |
| 11,535,161 | B1 * | 12/2022 | Walker | B60R 3/02 |
| 11,577,791 | B2 * | 2/2023 | Hung | B60R 3/02 |
| 11,603,045 | B2 * | 3/2023 | Patterson | B62D 33/0273 |
| 11,608,123 | B2 * | 3/2023 | Jarjoura | B62D 33/0273 |
| 11,639,201 | B2 * | 5/2023 | Selle | B62D 33/03 |
| | | | | 296/51 |
| 11,643,018 | B2 * | 5/2023 | Nania | B60R 3/02 |
| | | | | 280/166 |
| 11,643,151 | B2 * | 5/2023 | Nania | B62D 33/0273 |
| | | | | 296/51 |
| 11,673,507 | B2 * | 6/2023 | Robinson | B60R 3/02 |
| | | | | 280/164.1 |
| 11,725,434 | B2 * | 8/2023 | Williams | E05F 15/43 |
| | | | | 701/49 |
| 11,780,373 | B2 * | 10/2023 | Salter | B62D 33/03 |
| | | | | 296/62 |
| 11,873,033 | B2 * | 1/2024 | Lehti | B60R 3/02 |
| 11,987,209 | B2 * | 5/2024 | Glickman | B60D 1/01 |
| 12,005,968 | B2 * | 6/2024 | Horner | B60J 5/108 |
| 12,071,102 | B2 * | 8/2024 | Glickman | G01L 1/225 |
| 12,202,437 | B2 * | 1/2025 | Glickman | B60R 3/02 |
| 12,208,771 | B2 * | 1/2025 | Ricketts | B62D 33/0273 |
| 12,233,955 | B2 * | 2/2025 | Salter | B60Q 1/307 |
| 12,409,783 | B2 * | 9/2025 | Ebanks | B60Q 1/30 |
| 2002/0070577 | A1 * | 6/2002 | Pool, III | B60R 3/02 |
| | | | | 296/62 |
| 2005/0006870 | A1 * | 1/2005 | Williams | B60R 3/02 |
| | | | | 280/166 |
| 2006/0091642 | A1 * | 5/2006 | Goldstein | B60R 3/02 |
| | | | | 280/504 |
| 2006/0170180 | A1 * | 8/2006 | Collins | B60R 9/06 |
| | | | | 280/166 |
| 2008/0042394 | A1 * | 2/2008 | Park | B60R 3/02 |
| | | | | 280/166 |
| 2009/0008896 | A1 * | 1/2009 | Phillips | B60R 3/007 |
| | | | | 280/166 |
| 2009/0079157 | A1 * | 3/2009 | Fratzke | B60R 3/02 |
| | | | | 280/166 |
| 2015/0060205 | A1 * | 3/2015 | Blackwell | B60R 3/007 |
| | | | | 182/223 |
| 2015/0084304 | A1 * | 3/2015 | Mendoza | B60R 3/02 |
| | | | | 280/163 |
| 2017/0274940 | A1 * | 9/2017 | Povinelli | B60P 1/26 |
| 2017/0291551 | A1 * | 10/2017 | Krajenke | B62D 33/0273 |
| 2017/0298675 | A1 * | 10/2017 | Dimig | B60R 3/02 |
| 2021/0129758 | A1 * | 5/2021 | Wymore | B60R 3/007 |
| 2021/0146842 | A1 * | 5/2021 | Niemela | B60R 11/06 |
| 2021/0221448 | A1 * | 7/2021 | Hung | B62D 33/0273 |
| 2022/0001728 | A1 * | 1/2022 | Nania | B62D 33/0273 |
| 2022/0161869 | A1 * | 5/2022 | Nania | B62D 33/0273 |
| 2022/0314888 | A1 * | 10/2022 | Glickman | B62D 33/0273 |
| 2022/0314889 | A1 * | 10/2022 | Glickman | B62D 33/0273 |
| 2023/0008195 | A1 * | 1/2023 | Salter | B62D 33/0273 |
| 2023/0382306 | A1 * | 11/2023 | Brick | B60R 3/02 |
| 2024/0253712 | A1 * | 8/2024 | Nania | B62D 33/0273 |
| 2024/0300591 | A1 * | 9/2024 | Boisvert | B60R 7/02 |
| 2024/0359750 | A1 * | 10/2024 | Krishnan | B60R 3/02 |
| 2025/0033710 | A1 * | 1/2025 | Taylor | E05B 15/004 |
| 2025/0196775 | A1 * | 6/2025 | Nania | B60R 19/48 |

* cited by examiner

Control module 152

156 → Alarm 154

SYSTEMS FOR ACCESSING CARGO SPACES ON VEHICLES EQUIPPED WITH A TAILGATE ASSEMBLY THAT INCLUDES A DOOR SUBASSEMBLY

CROSS-REFERENCE TO RELATED APPLICATIONS

This is a divisional of U.S. application Ser. No. 17/223,488, which was filed on Apr. 6, 2021 and is incorporated by reference herein in its entirety.

TECHNICAL FIELD

This disclosure relates to motor vehicles, and more particularly to systems for accessing and utilizing vehicle cargo spaces on vehicles equipped with a tailgate assembly having a door subassembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

A deployable step system for a vehicle according to an exemplary aspect of the present disclosure includes, among other things, a hitch tube and a deployable step mounted to the hitch tube and movable between a stowed position and a deployed position.

In a further non-limiting embodiment of the foregoing deployable step system, the hitch tube extends in cross-width direction of the vehicle and is a component of a vehicle body of the vehicle. A trailer hitch is mounted to the hitch tube.

In a further non-limiting embodiment of either of the foregoing deployable step systems, the deployable step is mounted to the hitch tube by a mounting bracket.

In a further non-limiting embodiment of any of the foregoing deployable step systems, the deployable step includes a first leg mounted to the hitch tube, a second leg mounted to the hitch tube, and a planar member extending between the first leg and the second leg. The planar member provides a step surface when positioned in the deployed position.

In a further non-limiting embodiment of any of the foregoing deployable step systems, a control module is programmed to command the deployable step to move from the stowed position to the deployed position when a door subassembly of a tailgate assembly is moved from a door closed position to a door open position.

In a further non-limiting embodiment of any of the foregoing deployable step systems, the control module is further programmed to command that a height of the vehicle be lowered when the deployable step is moved to the deployed position.

In a further non-limiting embodiment of any of the foregoing deployable step systems, the control module is configured to command an air suspension of the vehicle to release air to lower the height of the vehicle.

In a further non-limiting embodiment of any of the foregoing deployable step systems, the door subassembly is configured to pivot between the door closed position and the door open position.

In a further non-limiting embodiment of any of the foregoing deployable step systems, the door subassembly is configured to slide between the door closed position and the door open position.

In a further non-limiting embodiment of any of the foregoing deployable step systems, the deployable step is integrated into a bumper shell of a bumper of the vehicle and is mounted outboard of a bumper step of the bumper.

In a further non-limiting embodiment of any of the foregoing deployable step systems, the deployable step includes an outer case, a carriage movable within the outer case, and a step cleat movable relative to the carriage.

In a further non-limiting embodiment of any of the foregoing deployable step systems, the outer case is mounted directly to the hitch tube.

In a further non-limiting embodiment of any of the foregoing deployable step systems, the step cleat includes a light pipe.

A tailgate assembly for a vehicle according to another exemplary aspect of the present disclosure includes, among other things, a frame subassembly and a door subassembly connected to the frame subassembly. The frame assembly and the door subassembly are pivotable together between a tailgate closed position and a tailgate open position. The door subassembly is pivotable or slidable relative to the frame subassembly between a door closed position and a door open position. A deployable step system is integrated as part of the door subassembly.

In a further non-limiting embodiment of the foregoing tailgate assembly, the door subassembly provides a cargo bed access opening when positioned in the door open position.

In a further non-limiting embodiment of either of the foregoing tailgate assemblies, the deployable step system includes a deployable step connected to the door subassembly by a pivot assembly.

In a further non-limiting embodiment of any of the forgoing tailgate assemblies, the deployable step is pivotable between a stowed position and a deployed position. A top side of a handle of the deployable step establishes at least a portion of a corner of the door subassembly in the stowed position and an underside of the handle establishes a step surface in the deployed position.

In a further non-limiting embodiment of any of the forgoing tailgate assemblies, the deployable step system includes a deployable lift panel that is pivotable between a stowed position and a deployed position and is further movable between the deployed position and a lowered position that is vertically below the door subassembly.

In a further non-limiting embodiment of any of the forgoing tailgate assemblies, the system includes a strain gauge and a control module operably connected to the strain gauge. The control module is programmed to command an alert in response to a signal from the strain gauge indicating that an amount of stress on the door subassembly exceeds a predefined threshold.

A tailgate assembly for a vehicle according to another exemplary aspect of the present disclosure includes, among other things, a frame subassembly and a door subassembly connected to the frame subassembly. The frame assembly and the door subassembly are pivotable together between a tailgate closed position and a tailgate open position. The door subassembly is pivotable or slidable relative to the frame subassembly between a door closed position and a door open position. A deployable cargo extender system is connectable to the door subassembly when the door subassembly is positioned in the door open position.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
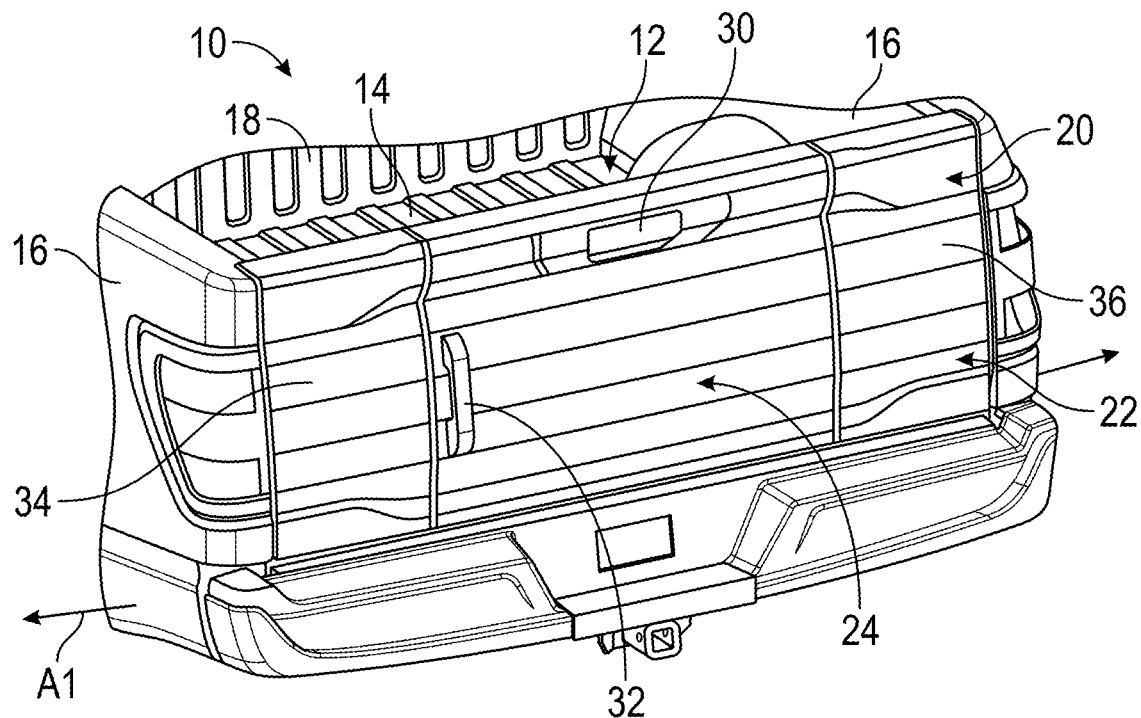
FIG. 1 is a rear perspective view of a motor vehicle equipped with a cargo space and a tailgate assembly positioned in a tailgate closed position relative to the cargo space.

This disclosure details various vehicle systems for accessing and utilizing vehicle cargo spaces on vehicles equipped with a tailgate assembly having a door subassembly. The vehicle systems may include deployable step systems, deployable lift panel systems, deployable cargo extender systems, etc. The vehicle systems may be either separate from or integrated with the door subassembly of the tailgate assembly. An exemplary vehicle system may include a deployable step that is movable between a stowed position and a deployed position in order to present a step surface to a user for accessing the vehicle cargo space. These and other features of this disclosure are described in greater detail below.

FIGS. 1, 2, 3, and 4 illustrate select portions of a motor vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 12 is generally rearward of a passenger cabin (not shown) of the vehicle 10 and includes a floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 may include, among other things, a frame subassembly 22 and a door subassembly 24. The door subassembly 24 may sometimes be referred to as a "swing gate subassembly." The frame subassembly 22 may include a driver side section 34, a passenger side section 36, and a connection member 38 (see FIG. 3) connected between the driver side section 34 and the passenger side section 36. The door subassembly 24 may be connected to either the driver side section 34 or the passenger side section 36 by a hinge assembly 35 (see FIG. 3).

Figure 2:
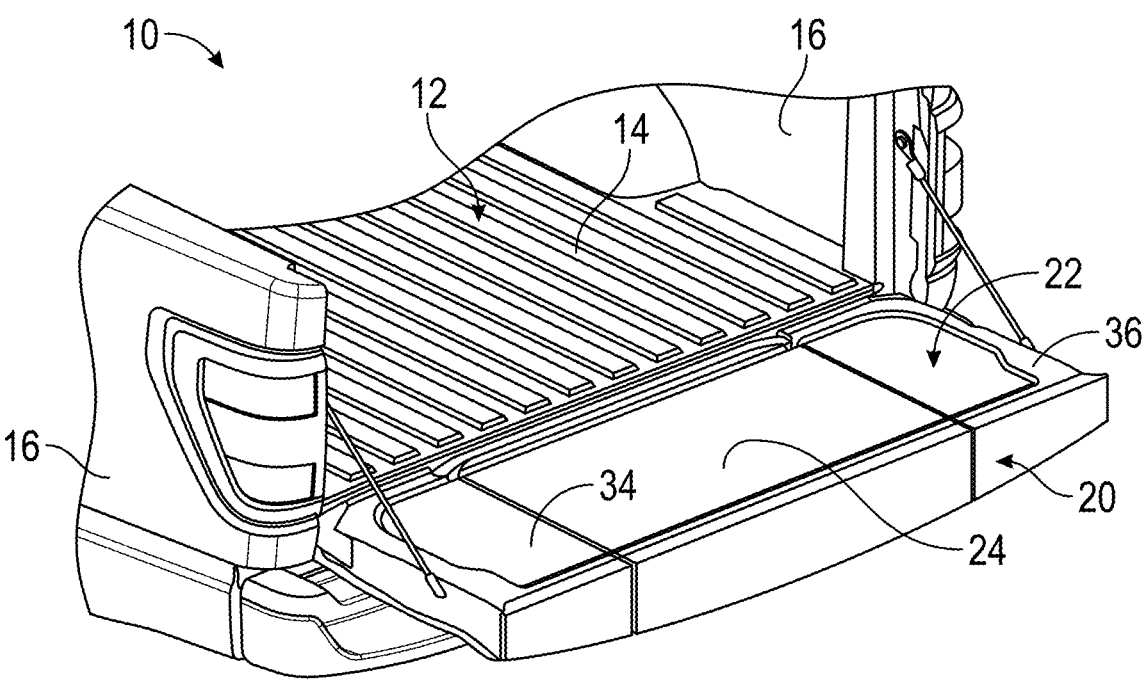
FIG. 2 illustrates the tailgate assembly of FIG. 1 in a tailgate open position.

The tailgate assembly 20 is pivotable about a first axis A1 relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 30 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

The door subassembly 24 of the tailgate assembly 20 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figure 3:
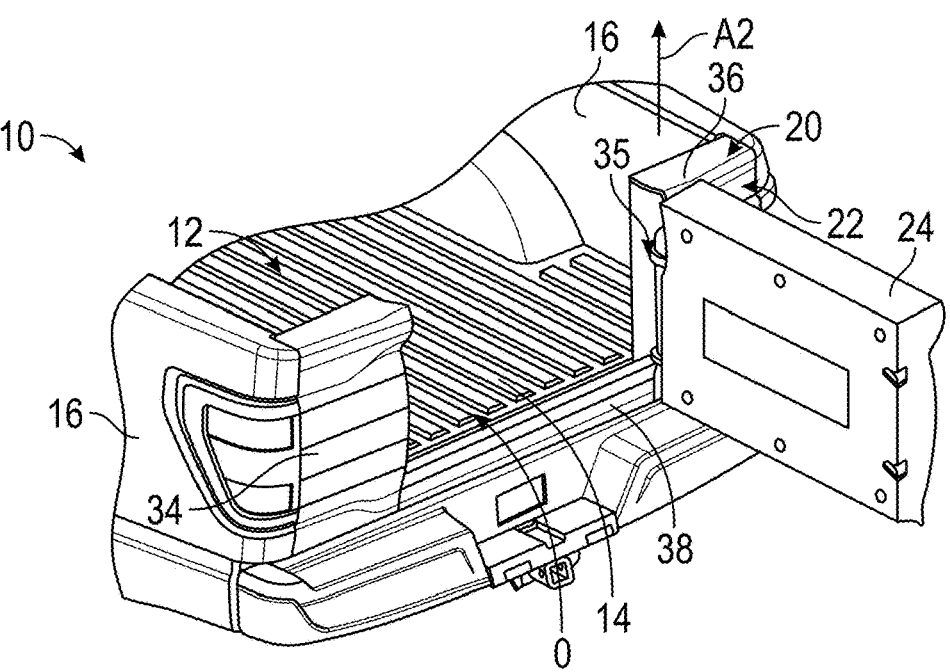
FIG. 3 illustrates a door subassembly of the tailgate assembly of FIG. 1 in a door open position.

When in the tailgate closed position, the door subassembly 24 is pivotable relative to the frame subassembly 22 about a second axis A2 between the door closed position shown in FIG. 1 and a door open position shown in FIG. 3. In an embodiment, the first axis A1 is a horizontally extending axis, and the second axis A2 is transverse to the first axis A1 and is a vertically extending axis. The door subassembly 24 may be moved between the door closed position and the door open position by grasping a second handle 32 (see FIG. 1) of the tailgate assembly 20, for example.

The door subassembly 24 provides a cargo bed access opening O when moved to the door open position. In an embodiment, the cargo bed access opening O extends vertically downward at least as far as the floor 14 of the cargo bed 12. A user 26 (see FIG. 4) can access the cargo bed 12 through the cargo bed access opening O when the door subassembly 24 in positioned in the door open position. Placing the door subassembly 24 in the door open position allows the user 26 to move closer to the cargo bed 12 than, for example, if the tailgate assembly 20 were moved to the tailgate open position of FIG. 2.

Figure 4:
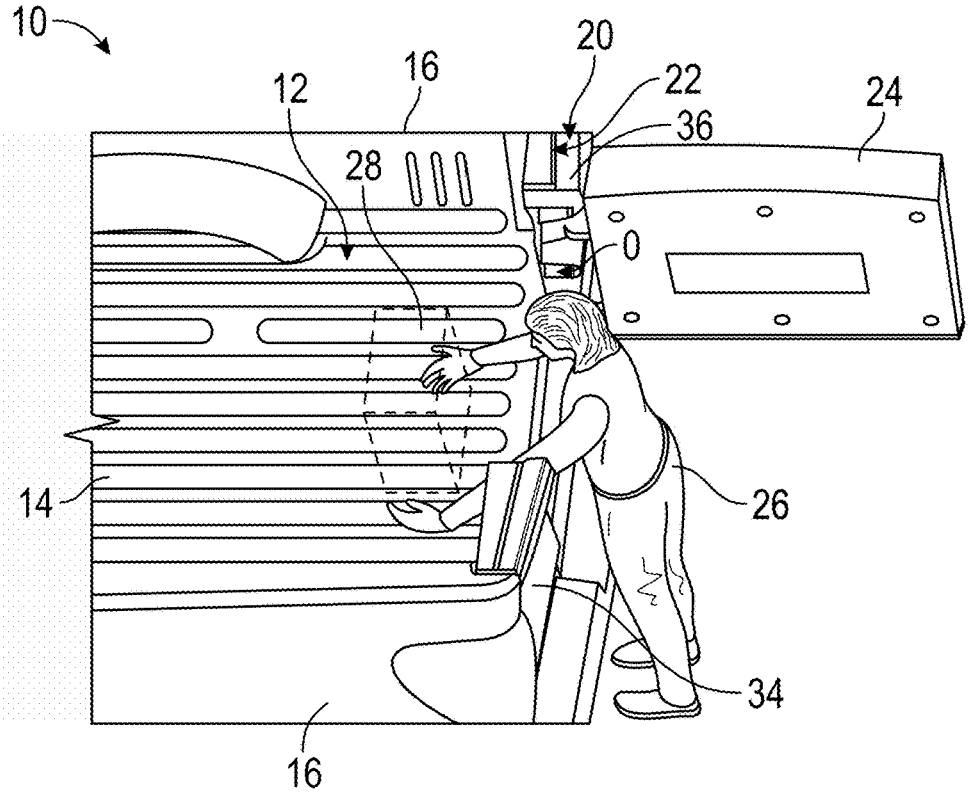
FIG. 4 is a rear and top view of the tailgate assembly and the door subassembly of FIG. 3.

The cargo bed access opening O can also provide clearance for the user 26 to enter the cargo bed 12 to either load or retrieve an item of cargo 28 (see FIG. 4). The user 26 may require assistance for stepping up and accessing the cargo bed 12 from the ground. The user 26 may also desire to further leverage the space afforded by the cargo bed 12. This disclosure is therefore directed to systems for enabling improved access to and utilization of the cargo bed 12.

Figures 5, 6A, 6B:
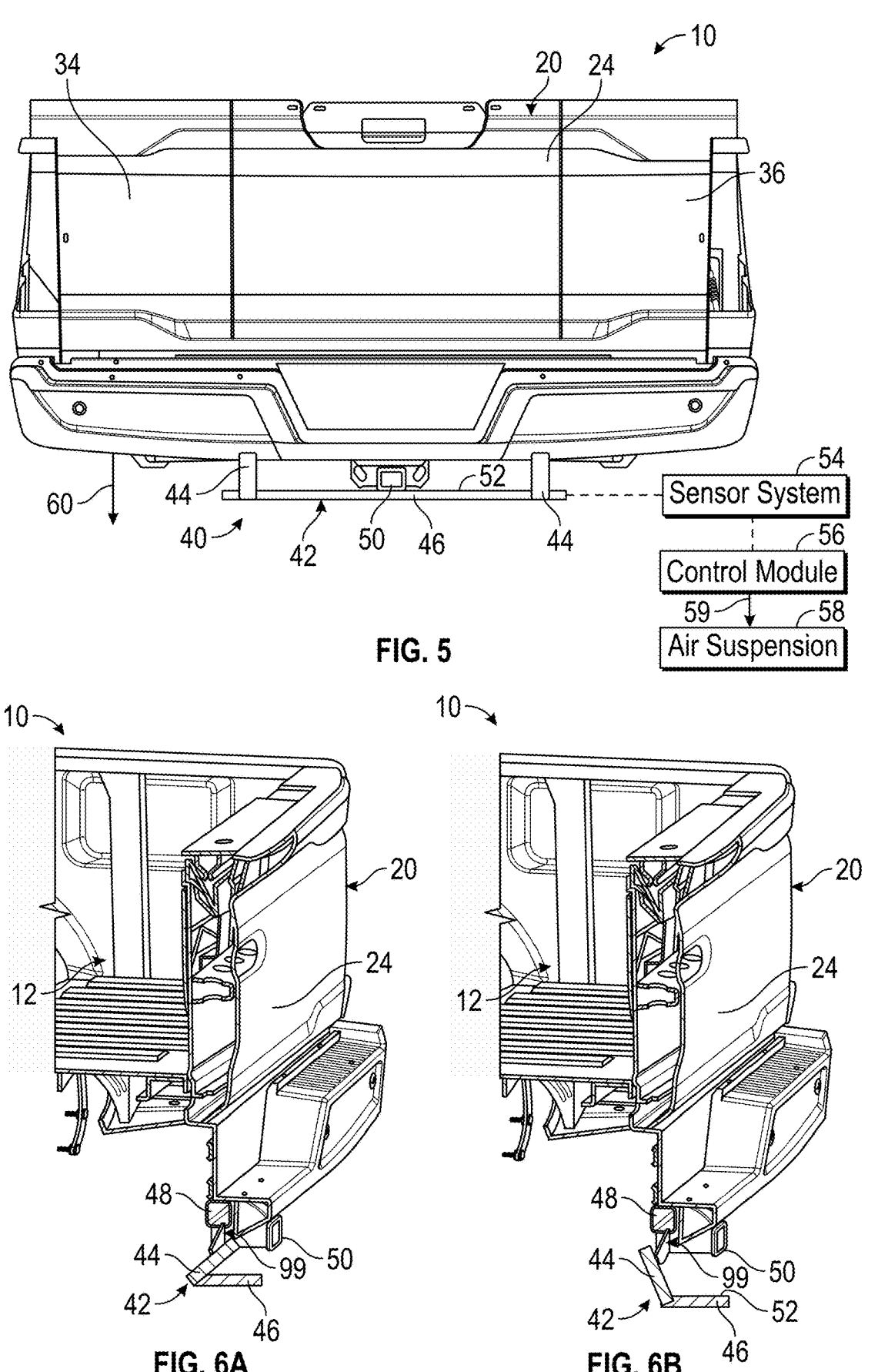
FIG. 5 illustrates a deployable step system for accessing a vehicle cargo space.
FIGS. 6A and 6B schematically illustrate movement of the deployable step system of FIG. 5 between a stowed position and a deployed position.

FIGS. 5, 6A, and 6B illustrate a deployable step system 40 that can be utilized in connection with the tailgate assembly 20 of FIGS. 1-4. The deployable step system 40 may be configured for assisting the user in accessing the cargo bed 12 when the door subassembly 24 is moved to the door open position shown in FIGS. 3 and 4.

The deployable step system 40 may include a deployable step 42 that includes a pair of legs 44 and a planar member 46 extending between the legs 44. In an embodiment, the planar member 46 is pivotably connected to the legs 44. Each leg 44 may be mounted (e.g., welded) to a hitch tube 48 (e.g., either directly or via a separate mounting bracket 99) of the vehicle 10. The hitch tube 48 extends in cross-width direction of the vehicle 10 and is an integral component of a vehicle body of the vehicle 10. In an embodiment, the hitch tube 48 extends across a majority of the width of the vehicle 10.

The hitch tube 48 may support a trailer hitch 50 of the vehicle 10. The trailer hitch 50 may provide a receiver tube adapted to receive another trailer component (e.g., a ball mount) for connecting a trailer to the vehicle 10. Each leg 44 of the deployable step 42 may be mounted to the hitch tube 48 at a location that is outboard of the trailer hitch 50. The The deployable step 42 is movable between a stowed position of FIG. 6A and a deployed position of FIG. 6B. The deployable step 42 may be manually or automatically moved, such as via a linkage assembly and a motor, between the stowed and deployed positions. When moved to the deployed position, the planar member 46 of the deployable step 42 extends underneath of the trailer hitch 50 and may provide a step surface 52 that can be presented to the user for accessing the cargo bed 12. The deployable step 42 may be moved between the stowed and deployed positions even when a trailer or other component is coupled to the trailer hitch 50.

The deployable step system 40 may additionally include a sensor system 54 and a control module 56 that are operably connected to one another. The sensor system 54 may include a multitude of sensors (e.g., ultrasonic sensors, radar sensors, or both) arranged and configured for monitoring the environment to the rear of the vehicle 10. For example, the sensor system 54 may monitor the environment to the rear of the vehicle 10 for detecting obstructions in a door opening path of the door subassembly 24 of the tailgate assembly 20.

Although schematically illustrated as a single controller, the control module 56 may be part of a vehicle control system that includes a plurality of additional control modules for interfacing with and commanding operation of the various components of the vehicle 10. In an embodiment, the control module 56 is part of a body control module (BCM) of the vehicle 10. However, other configurations are also contemplated.

In an embodiment, the control module 56 is programmed to automatically command deployment of the deployable step 42 when the door subassembly 24 of the tailgate assembly 20 is moved to the door open position.

In another embodiment, the control module 56 is programmed to automatically command that the height of the vehicle 10 be lowered when the deployable step 42 is moved to the deployed position. For example, in response to deploying the deployable step 42, the control module 56 may communicate a command signal 59 to an air suspension 58 of the vehicle 10 for "kneeling" the rear end of the vehicle 10. The command signal 59 instructs the air suspension 58 to release air (e.g., from a suspension member such as a shock), thereby lowing the rear end of the vehicle 10 in a direction of arrow 60 (i.e., toward the ground).

In the lowered or "kneeled" position of the vehicle 10, the deployable step 42 is positioned vertically lower relative to the ground. The user, particularly a user having a small stature, can place their foot on the step surface 52 in this position to more easily step up and into the cargo bed 12.

Figure 7:
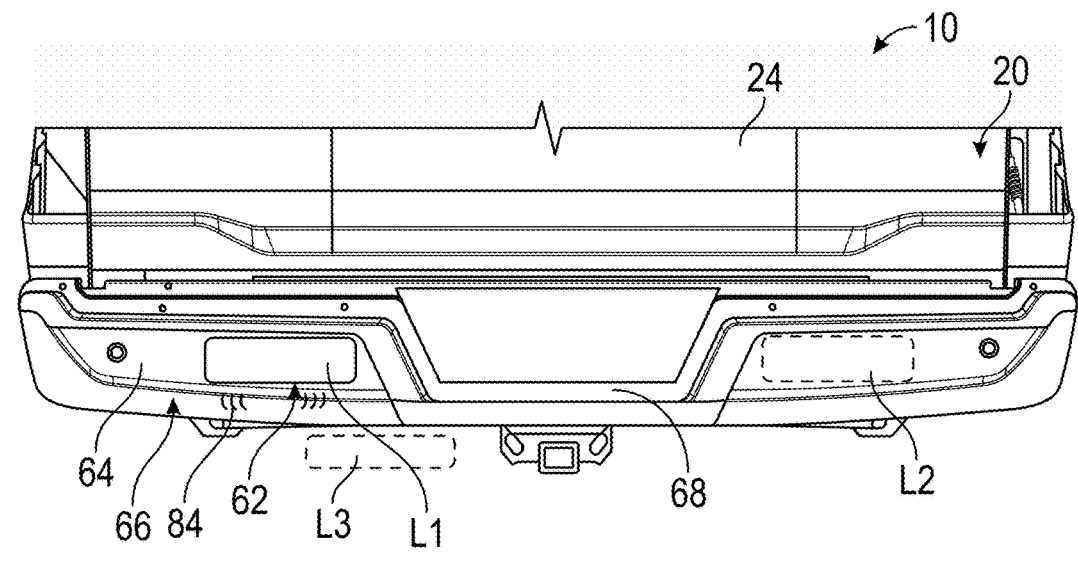
FIG. 7 illustrates another exemplary deployable step system for accessing a vehicle cargo space.
Figure 8:
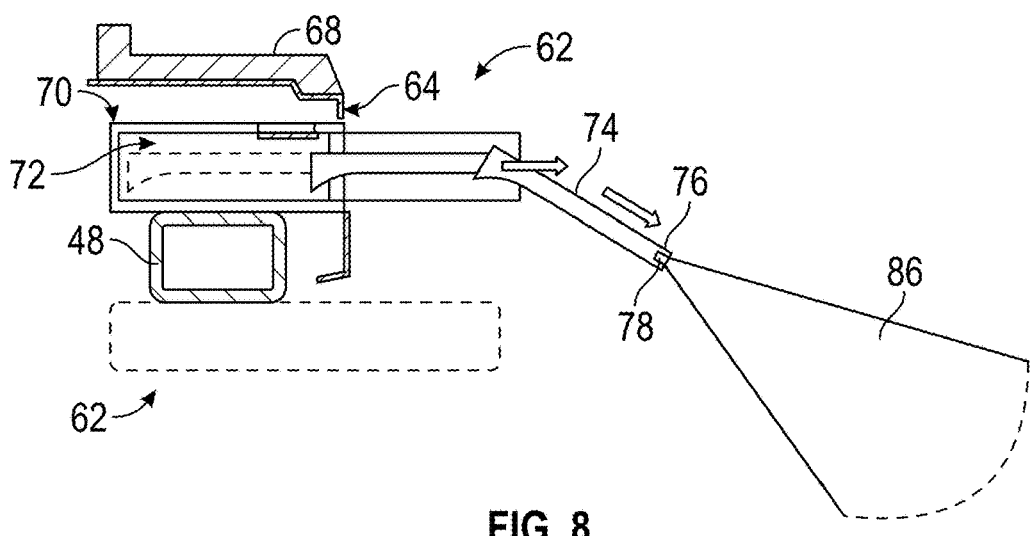
FIG. 8 is a cross-sectional view of the deployable step system of FIG. 7.
Figure 9:
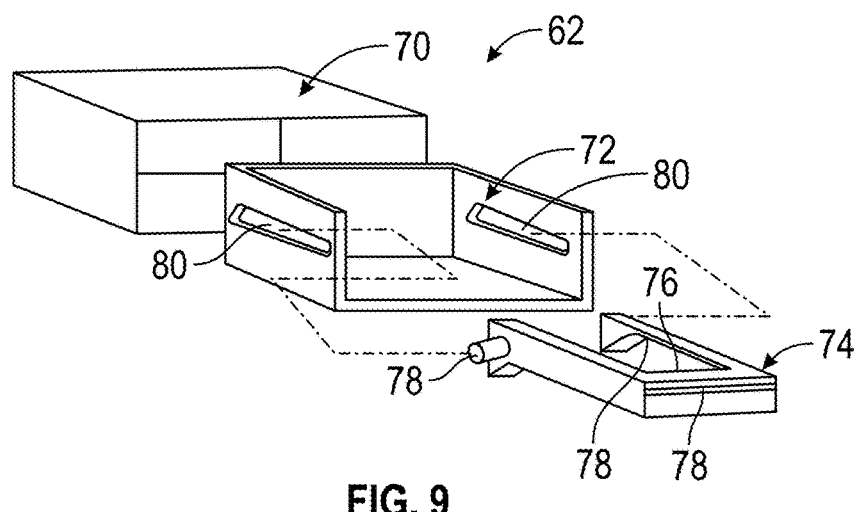
FIG. 9 is an exploded view of the deployable step system of FIG. 7.

FIGS. 7, 8, and 9 illustrate another exemplary deployable step system 62 that can be utilized in connection with the tailgate assembly 20 of FIGS. 1-4. The deployable step system 62 may be configured for assisting the user in accessing the cargo bed 12 when the door subassembly 24 of the tailgate assembly 20 is moved to the door open position shown in FIGS. 3 and 4.

The deployable step system 62 may provide a pop-out step design that is integrated into a bumper shell 64 of a bumper 66 of the vehicle 10. In an embodiment, the deployable step system 62 is mounted at a location L1 that is outboard of a bumper step 68 of the bumper 66. In another embodiment, the deployable step system 62 is mounted at a location L2 that is on the opposite side of the bumper step 68 from the location L1. In yet another embodiment, two deployable step systems 62 could be provided, with one deployable step system 62 provided at both the location L1 and the location L2.

At the locations L1, L2, the deployable step system 62 is mounted on top of the hitch tube 48 of the vehicle. In another embodiment, the deployable step system 62 is mounted on the bottom of the hitch tube 48 (see, e.g., location L3 of FIG. 7; also schematically shown using phantom lines in FIG. 8) and is thus does not have to be integrated into the bumper shell 64.

The deployable step system 62 may include an outer case 70, a carriage 72, and a step cleat 74. The outer case 70 may be bolted or welded directly to the hitch tube 48 and may be slightly recessed within the bumper shell 64. The outer case 70 is impact resistant and is configured for protecting the carriage 72 and the step cleat 74 from dirt, mud, stones, debris, rain, ice, etc.

The carriage 72 may be slidably received within the outer case 70. The carriage 72 may be moved between a stowed position shown in FIG. 7 and a deployed position shown in FIG. 8. Although not specifically shown, various components (e.g., springs, slides, etc.) may be provided for configuring the carriage 72 for movement relative to the outer case 70.

Once the carriage 72 is moved to the deployed position, the step cleat 74 may be moved to a deployed position shown in FIG. 8. When moved to the deployed position, the step cleat 74 provides a step surface 76 for allowing the user to step up and into the cargo bed 12. The carriage 72 and the step cleat 74 may be moved to their respective deployed positions either manually (e.g., via push-to-release mechanisms) or automatically (e.g., via linear or rotational motorized mechanisms).

In an embodiment, the step cleat 74 includes a pair of pins 78 that are received within grooves 80 of the carriage 72 for guiding movement of the step cleat 74 relative to the carriage 72. However, an opposite configuration is also contemplated in which the pins 78 are part of the carriage 72 and the grooves 80 are part of the step cleat 74 for guiding movement.

In another embodiment, the step surface 76 of the step cleat 74 is equipped with a light pipe 82 for illuminating the step surface 76 via a light source (e.g., an LED, not shown) during certain vehicle conditions. For example, the light pipe 82 may be illuminated to provide an auxiliary brake or backup lamp feature (schematically shown at reference numeral 84 of FIG. 7) when the step cleat 74 is in the stowed position and/or may be illuminated to provide a puddle lamp feature (schematically shown at reference numeral 86 of FIG. 8) when the step cleat 74 is in the deployed position.

Figure 10:
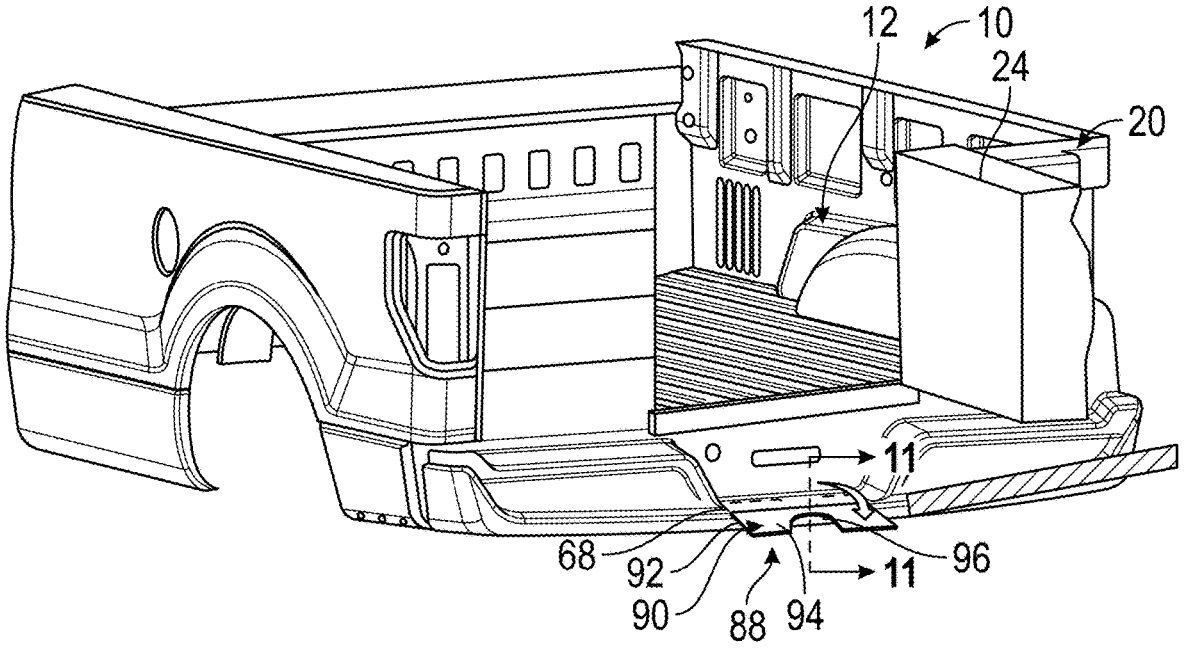
FIG. 10 illustrates another exemplary deployable step system for accessing a vehicle cargo space.
Figure 11:
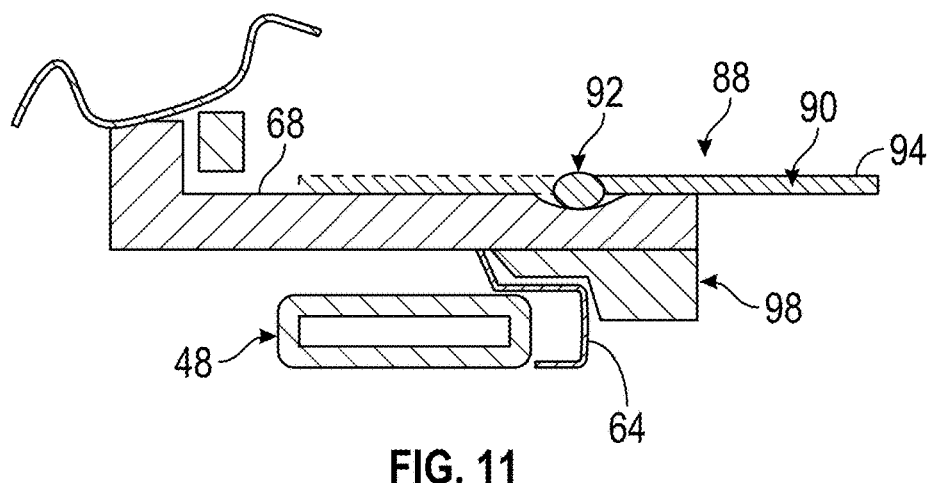
FIG. 11 is a cross-sectional view of the deployable step system of FIG. 10.

FIGS. 10 and 11 illustrate another exemplary deployable step system 88 that can be utilized in connection with the tailgate assembly 20 of FIGS. 1-4. The deployable step system 88 may be configured for assisting the user in accessing the cargo bed 12 when the door subassembly 24 of the tailgate assembly 20 is moved to the door open position shown in FIGS. 3-4.

The deployable step system 88 may include a flip step 90 and a hinge assembly 92. The hinge assembly 92 may pivotably attach the flip step 90 to the bumper step 68 of the bumper 66 of the vehicle 10.

The flip step 90 is pivotable between a stowed position (shown in phantom) and a deployed position. In the deployed position, an underside 94 of the flip step 90 is presented to the user 26. The underside 94 can be used by the user as a step surface.

The flip step 90 may optionally include a cutout 96. The cutout 96 may be sized and shaped for accommodating a hitch ball or some other hitching mechanism that is secured to and/or interfaces with the bumper step 68.

In an embodiment, a bumper extension 98 is mounted between the bumper step 68 and the bumper shell 64 of the bumper 66 (see FIG. 11). In another embodiment, a support tube 100 is mounted between the bumper step 68 and the trailer hitch 50 (see FIG. 12), which mounts to the hitch tube 48. The bumper extension 98/support tube 100 provides added support for supporting the flip step 90 when positioned in the deployed position.

Figures 12, 13:
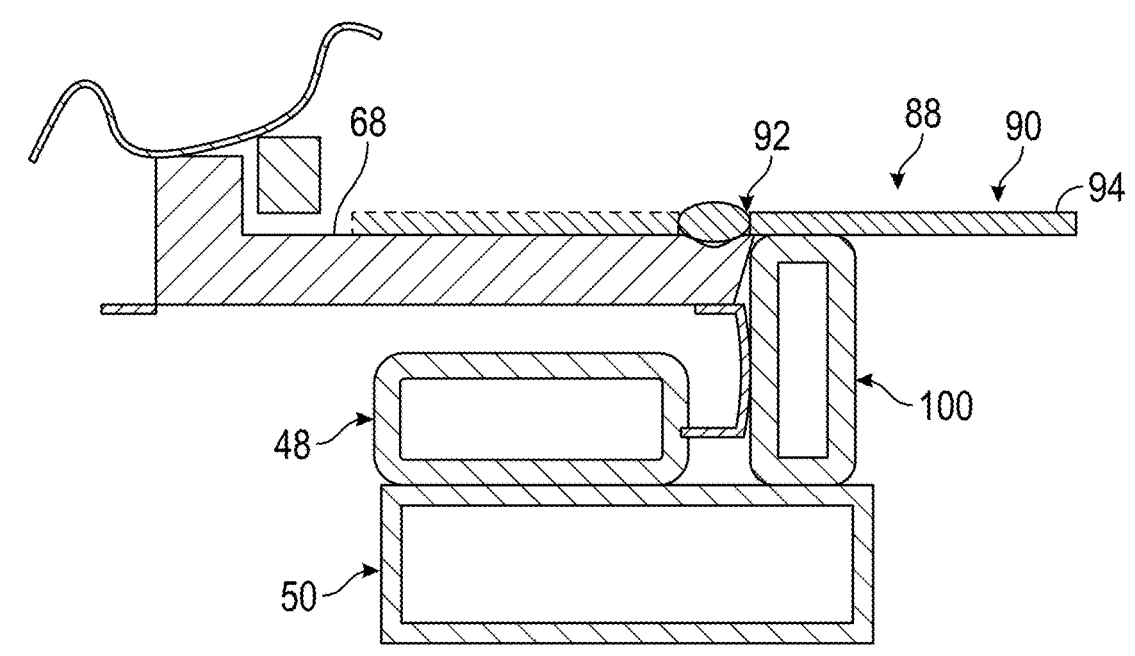
FIG. 12 illustrates another exemplary deployable step system.
FIG. 13 illustrates another exemplary deployable step system.

FIG. 13 illustrates yet another deployable step system 102 that can be utilized in connection with the tailgate assembly 20 of FIGS. 1-4. The deployable step system 102 may be configured for assisting the user in accessing the cargo bed 12 when the door subassembly 24 of the tailgate assembly 20 is moved to the door open position.

In this embodiment, the deployable step system 102 is integrated as part of the door subassembly 24 of the tailgate assembly 20. The deployable step system 102 may include a deployable step 104 connected to the door subassembly 24 by a pivot assembly 106.

The deployable step 104 is pivotable between a stowed position (shown in phantom) and a deployed position. In the stowed position, a top side 108 of a handle 110 of the deployable step 104 establishes portions of an upper corner surface of the door subassembly 24. In the deployed position, the deployable step 104 is rotated about the pivot assembly 106 to a position vertically below the door subassembly 24 such that an underside 112 of the handle 110 is presented to the user 26. The underside 112 can be used by the user 26 as a step surface for accessing the cargo bed 12.

In an embodiment, the handle 110 of the deployable step 104 may include a lighting module 114 configured for emitting light. The lighting module 114 may be mounted at a corner of the handle 110 and may include one or more light sources, such as LEDs.

In the stowed position of the deployable step 104, the lighting module 114 may emit light for providing an auxiliary bed lamp feature (shown schematically at reference numeral 116) for illuminating portions of the cargo bed 12. In the deployed position of the deployable step 104, a light pipe 118 of the handle 110 may be illuminated by the lighting module 114 for providing a puddle lamp feature (schematically shown at reference numeral 120). The auxiliary bed lamp and puddle lamp features may be provided by different light sources of the lighting module 114. In such an embodiment, the light source that provides the auxiliary bed lamp or the light source that provides puddle lamp is turned off when the other of the light source that provides the auxiliary bed lamp or the light source that provides the puddle lamp is turned on.

The deployable step system 102 may additionally include a strain gauge 122 and a control module 124 that are operably connected to one another. The strain gauge 122 may be mounted near a hinge side 126 of the door subassembly 24 and is configured to monitor an amount of stress being applied to the door subassembly 24, such as while a user is stepping on the deployable step 104 and thus applying a force thereto.

In an embodiment, the control module 124 is programmed to automatically command an alarm 128 when an amount of stress being applied to the door subassembly exceeds a predefined threshold. For example, in response to input signals from the strain gauge 122, the control module 56 may determine whether the predefined threshold has been exceeded and may communicate a command signal 130 to the alarm 128 for alerting the user of the overstress conditions. The command signal 130 instructs the alarm 128 to produce the alert for indicating the potential overstress situation to a user. The alert may be in the form of an audible alert, a message displayed on a human machine interface of the vehicle 10, a message displayed on a personal electronic device (e.g., a smart phone) of the operator of the vehicle 10, etc.

The amount of stress experienced by the door subassembly 24 may vary with the position (i.e., angle) of the door subassembly 24 relative to the frame subassembly 22. Therefore, a lookup table of stress versus door subassembly angle may be saved in the memory of the control module 124. The lookup table may be referenced by the control module 124 for determining whether or not the predefined threshold has been exceeded at any given position of door subassembly 24.

Figures 14A, 14B, 14C:
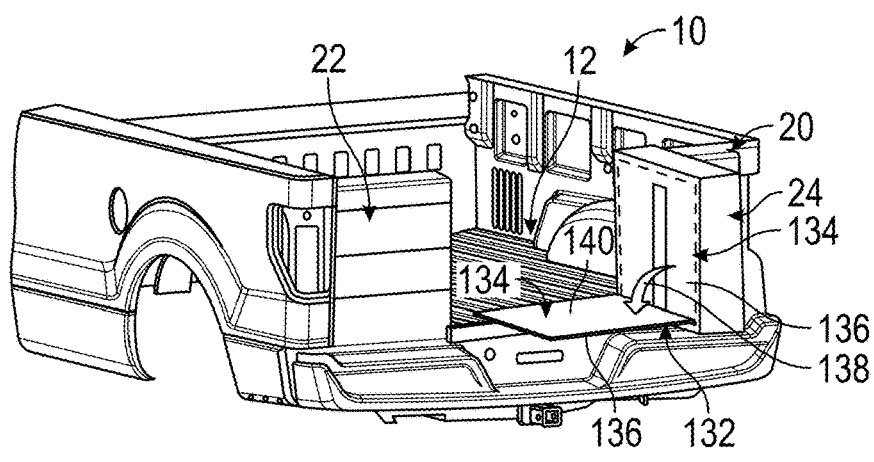
FIGS. 14A, 14B, and 14C illustrate yet another exemplary deployable step system.

FIGS. 14A, 14B, and 14C illustrate yet another deployable step system 132 that can be utilized in connection with the tailgate assembly 20 of FIGS. 1-4. The deployable step system 132 may be configured for assisting the user in accessing the cargo bed 12 when the door subassembly 24 of the tailgate assembly 20 is moved to the door open position.

In this embodiment, the deployable step system 132 is integrated as part of the door subassembly 24 of the tailgate assembly 20. The deployable step system 102 may include a deployable lift panel 134 that is movably connected to the door subassembly 24. The deployable lift panel 134 may be configured as a cargo lift or wheelchair lift, for example.

The deployable lift panel 134 is pivotable between a stowed position (shown in phantom in FIG. 14A) and a deployed position. In the stowed position, an outer surface 136 of the deployable lift panel 134 establishes an outer surface of the door subassembly 24. In the deployed position, the deployable lift panel 134 is rotated outwardly (schematically illustrated by arrow 138) to a position that is transverse (e.g., about perpendicular) to the door subassembly 24 such that an inner surface 140 of the deployable lift panel 134 is presented to the user. The deployable lift panel 134 may then be lowered in the direction of arrow 141 to a position vertically below the door subassembly 24 by lowering an extendable arm 142 that is connected to the deployable lift panel 134. When lowered, the inner surface 140 of the deployable lift panel 134 can be used as a cargo lift for lifting cargo up and into the cargo bed 12.

In another embodiment, the deployable lift panel 134 may also be configured to move longitudinally toward or away from the cargo bed 12 (see arrow 143 of FIG. 14C). Various linkages and actuators may be provided for achieving such movement.

The deployable lift panel 134 may further include a lighting module 144 that is configured for emitting light. The lighting module 144 may be mounted to the deployable lift panel 134 and may include one or more light sources such as LEDs.

In the deployed and lowered position of the deployable lift panel 134 shown in FIG. 14B, the lighting module 144 may emit light for providing a puddle lamp feature (schematically shown at reference numeral 146). The puddle lamp feature may illuminate a landing zone 148 of the deployable lift panel 134 on the ground surface.

The deployable step system 132 may additionally include a strain gauge 150 and a control module 152 that are operably connected to one another. The strain gauge 150 may be mounted near a hinge side 126 of the door subassembly 24 and is configured to monitor an amount of stress being applied to the door subassembly 24, such as when cargo is loaded onto the deployable lift panel 134 and thus is applying a force thereto.

In an embodiment, the control module 152 is programmed to automatically command an alarm 154 when an amount of stress being applied to the door subassembly 24 exceeds a predefined threshold. For example, in response to input signals from the strain gauge 150, the control module 152 may determine whether the predefined threshold has been exceeded and may communicate a command signal 156 to the alarm 154 for alerting the user of the overstress conditions. The command signal 156 instructs the alarm 154 to produce the alert to the user 26, for example. The alert may be in the form of an audible alert, a message displayed on a human machine interface of the vehicle 10, a message displayed on a personal electronic device (e.g., a smart phone) of the user 26, etc.

The amount of stress experienced by the door subassembly 24 may vary with the position (i.e., angle) of the door subassembly 24 relative to the frame subassembly 22. Therefore, a lookup table of stress versus door subassembly angle may be saved in the memory of the control module 152. The lookup table may be accessed by the control module 152 for determining whether or not the predefined threshold has been exceeded at any given position of the door subassembly 24.

In another embodiment, the control module 152 is programmed to turn off the vehicle 10 when the deployable lift panel 134 is positioned in the deployed and lowered position shown in FIG. 14B. In this way, a user positioned on the deployable lift panel, such as a person in a wheelchair, for example, will not be exposed to exhaust gases emitted by the vehicle 10 during the lifting sequence.

Figures 15A, 15B, 16A, 16B:
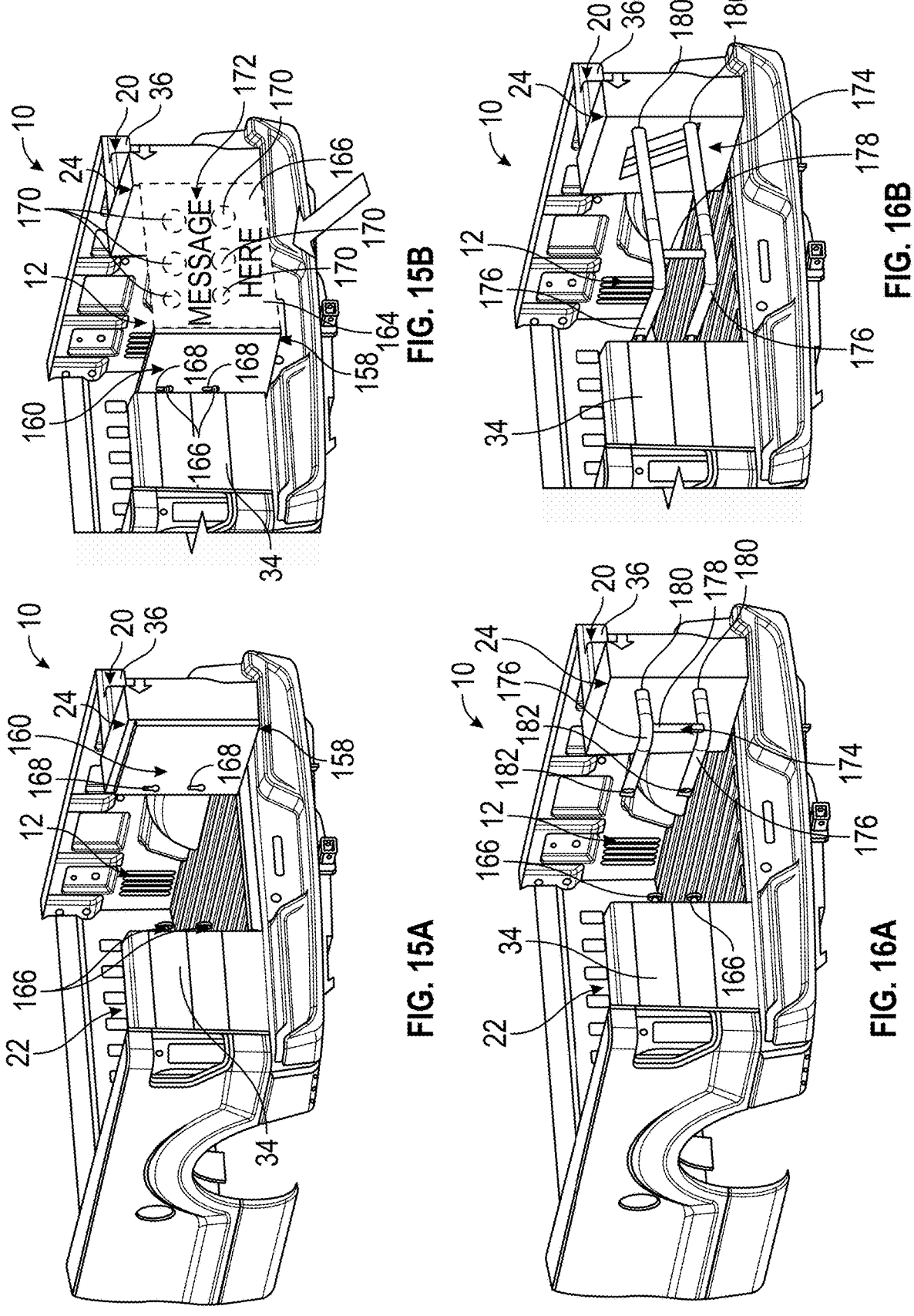
FIGS. 15A and 15B illustrate an exemplary deployable cargo extender system of a vehicle tailgate assembly.
FIGS. 16A and 16B illustrate another exemplary deployable cargo extender system of a vehicle tailgate assembly.

FIGS. 15A and 15B illustrate a deployable cargo extender system 158 that can be utilized in connection with the tailgate assembly 20 of FIGS. 1-4. The deployable cargo extender system 158 may be configured for allowing the user to selectively extend the cargo holding area provided by the cargo bed 12 when the door subassembly 24 of the tailgate assembly 20 is in the door open position.

The deployable cargo extender system 158 may be integrated as part of the door subassembly 24 of the tailgate assembly 20. The deployable cargo extender system 158 may include a latching panel 160, a connecting panel 162 that connects between the latching panel 160 and the door subassembly 24, and a bottom panel 164 that connects between the latching panel 160 and the door subassembly 24.

The deployable cargo extender system 158 is movable between a stowed position shown in FIG. 15A and a deployed position shown in FIG. 15B. In the stowed position, the latching panel 160 establishes an outer surface of the door subassembly 24. The connecting panel 162 and the bottom panel 164 may be concealed inside the door subassembly 24 when in the stowed position. In the deployed position, the latching panel 160 is spaced laterally apart from the door subassembly and may be connected to one of the sections of the frame subassembly 22 (here, the driver side section 34 of the frame subassembly 22). In an embodiment, exposed strikers 166 of the driver side section 34 may be received within openings 168 of the latching panel 160 to secure the deployable cargo extender system 158 in the deployed position.

The connecting panel 162 may establish a rear wall of the cargo bed 12 when the deployable cargo extender system 158 is moved to the deployed position, and the bottom panel 164 may establish a floor extension portion of the cargo bed 12 when the deployable cargo extender system 158 is moved to the deployed position. The connecting panel 162 and the bottom panel 164 both extend rearward of the driver and passenger side sections 34, 36 of the tailgate assembly 20 when the deployable cargo extender system 158 is in the deployed position, thereby extending the cargo holding area provided by the cargo bed 12.

A plurality of light sources 170 (e.g., wireless LEDs, micro-LEDs, etc.) may be embedded within the connecting panel 162 of the deployable cargo extender system 158. The light sources 170 may be controlled to produce various lighting effects 172 within the connecting panel 162. The lighting effects 172 may include any combination of letters, numbers, words, phrases, symbols, logos, etc. and may be produced for communicating information to nearby vehicles. In an embodiment, the lighting effects 172 indicate to nearby vehicles that the vehicle 10 has a long load and/or that the nearby vehicles should keep a proper distance away from the vehicle 10. In another embodiment, the lighting effects 172 include an advertisement. In yet another embodiment, the lighting effects 172 provide an auxiliary brake/tail/turn lighting function.

FIGS. 16A and 16B illustrate another exemplary deployable cargo extender system 174 that can be utilized in connection with the tailgate assembly 20 of FIGS. 1-4. The deployable cargo extender system 174 may be configured for allowing the user to selectively extend the cargo holding area provided by the cargo bed 12 when the door subassembly 24 of the tailgate assembly 20 is in the door open position.

In this embodiment, the deployable cargo extender system 174 is an accessory system that may be selectively connected to the door subassembly 24 of the tailgate assembly 20. The deployable cargo extender system 174 may include two or more tubes 176 that may be linked together by one or more linkages 178. The tubes 176 may be received at one end within openings 180 formed in the door subassembly 24. In an embodiment, the tubes 176 are telescoping tubes that may be manually expanded and retracted to increase or decrease the size of the tubes 176.

The deployable cargo extender system 174 is movable between a retracted position shown in FIG. 16A and a deployed position shown in FIG. 16B. In the stowed position, the tubes 176 are retracted. In the deployed position, the tubes 176 are expanded. In an embodiment, exposed strikers 166 of the driver side section 34 (and/or the passenger side section 36) of the frame subassembly 22 may be received within openings 182 of the tubes 176 to secure the deployable cargo extender system 174 in the deployed position. The deployable cargo extender system 174 enables the user 26 to extend the cargo holding area provided by the cargo bed 12.

Figure 17:
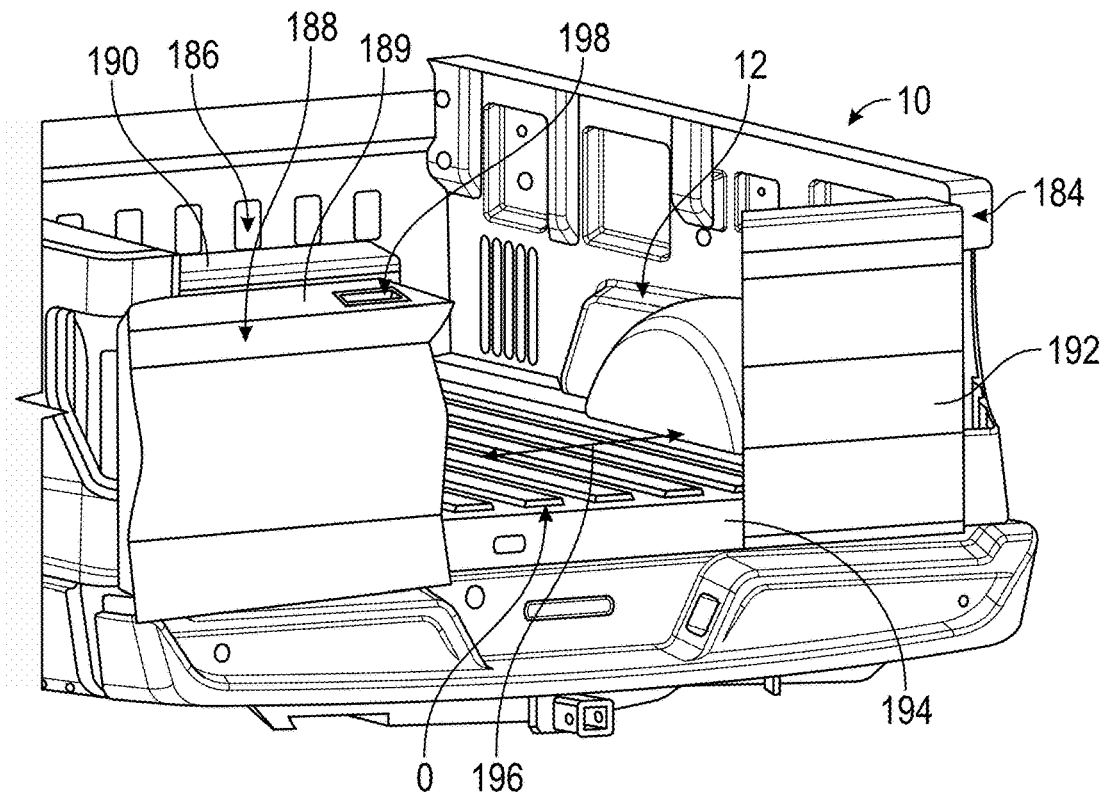
FIG. 17 illustrates another exemplary tailgate assembly having a door subassembly.
Figure 18:
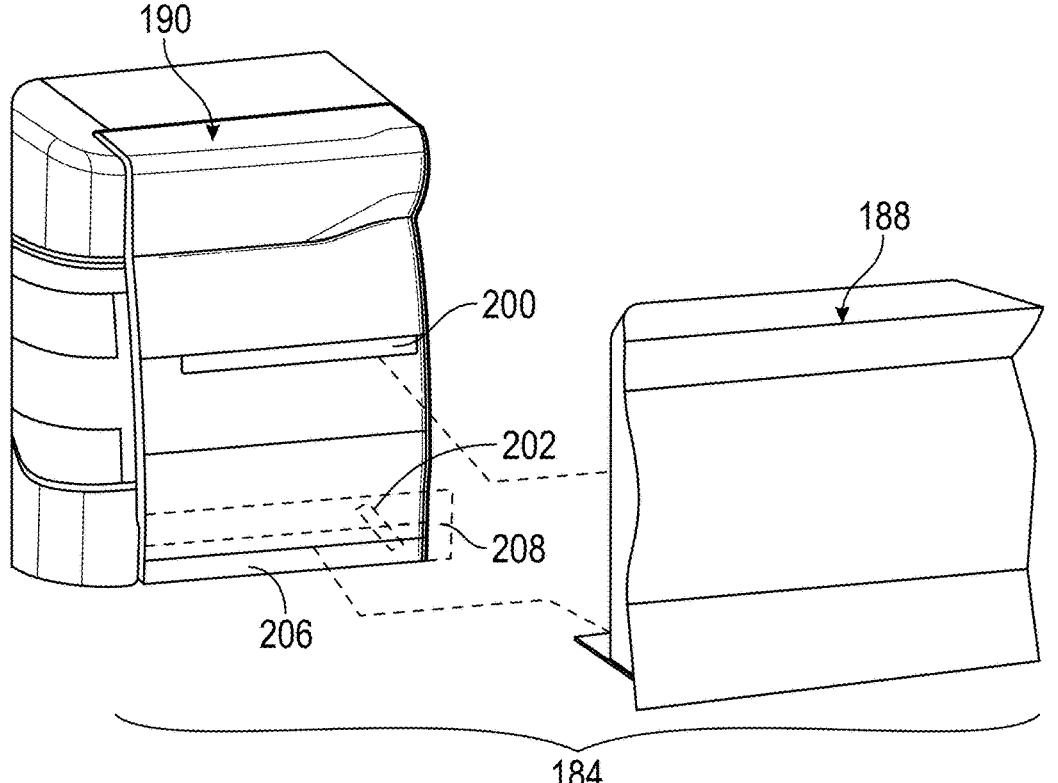
FIG. 18 is a partial exploded view of select portions of the tailgate assembly of FIG. 17.

FIGS. 17 and 18 illustrate another exemplary tailgate assembly 184 that may be employed on the vehicle 10. The tailgate assembly 184 may include, among other things, a frame subassembly 186 and a door subassembly 188. The frame subassembly 186 may include a driver side section 190, a passenger side section 192, and a connection member 194 connected between the driver side section 190 and the passenger side section 192.

The door subassembly 188 may be configured as a sliding door that is slidable relative to the driver side section 190, the passenger side section 192, or both. For example, when in the tailgate closed position, the door subassembly 188 may slide in a vehicle cross-width direction 196 relative to the frame subassembly 186. The door subassembly 188 may slide between a door closed position and the door open position shown in FIG. 17 by grasping a handle 198 that may be integrated into a top surface 189 of the door subassembly 188. The door subassembly 188 provides a cargo bed access opening O when moved to the door open position.

Movement of the door subassembly 188 may be guided by a horizontal track 200 provided on the driver side section 190 (and/or the passenger side section 192). An anti-chucking pin 202 may be provided to control fore/aft movement of the door subassembly 188 relative to a rear floor sill 206 of the cargo bed 12, and a control pin 208 may be provided to control up/down movement of the door subassembly 188 relative to the rear floor sill 206 (see FIG. 18).

Any of the deployable step systems and/or deployable cargo extender systems discussed above may be utilized in conjunction with the tailgate assembly 184 of FIGS. 17-18.

The systems of this disclosure provide solutions for improving access to and utilization of vehicle cargo spaces. The proposed systems include deployable step systems for improving the access to cargo spaces and cargo extending systems for improving the utilization of the cargo spaces on vehicles equipped with tailgate assemblies having door subassemblies. The proposed systems provide less complex and more cost effective solutions for accessing and utilizing the cargo spaces.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tailgate assembly for a vehicle, comprising:
a frame subassembly;
a door subassembly connected to the frame subassembly;
the frame subassembly and the door subassembly pivotable together about a first axis between a tailgate closed position and a tailgate open position;
the door subassembly pivotable relative to the frame subassembly about a second axis between a door closed position and a door open position, wherein the second axis is transverse to the first axis; and
a deployable step system or a deployable cargo extender system integrated as part of the door subassembly.

2. The tailgate assembly as recited in claim 1, wherein the door subassembly provides a cargo bed access opening when positioned in the door open position.

3. The tailgate assembly as recited in claim 1, wherein the deployable step system includes a deployable step connected to the door subassembly by a pivot assembly.

4. The tailgate assembly as recited in claim 1, wherein the deployable step system includes a deployable lift panel that is pivotable between a stowed position and a deployed position and is further movable between the deployed position and a lowered position that is vertically below the door subassembly.

5. The tailgate assembly as recited in claim 1, comprising a strain gauge and a control module operably connected to the strain gauge.

6. The tailgate assembly as recited in claim 5, wherein the control module is programmed to command an alert in response to a signal from the strain gauge indicating that an amount of stress on the door subassembly exceeds a predefined threshold.

7. The tailgate assembly as recited in claim 5, wherein the control module is further programmed to command that a height of the vehicle be lowered when the deployable step system is moved to a deployed position.

8. The tailgate assembly as recited in claim 7, wherein the control module is configured to command an air suspension of the vehicle to release air to lower the height of the vehicle.

9. The tailgate assembly as recited in claim 1, wherein the deployable cargo extender system is connectable to the door subassembly when the door subassembly is positioned in the door open position and is movable between a stowed position and a deployed position.

10. The tailgate assembly as recited in claim 9, wherein the deployable cargo extender system includes a latching panel, a connecting panel that connects between the latching panel and the door subassembly, and a bottom panel that connects between the latching panel and the door subassembly.

11. The tailgate assembly as recited in claim 10, wherein, in the stowed position, the latching panel establishes an outer surface of the door subassembly and the connecting panel and the bottom panel are concealed inside the door subassembly.

12. The tailgate assembly as recited in claim 10, wherein, in the deployed position, the latching panel is spaced laterally apart from the door subassembly, the connecting panel establishes a rear wall of a cargo bed of the vehicle, and the bottom panel establishes a floor extension portion of the cargo bed.

13. The tailgate assembly as recited in claim 10, comprising a plurality of light sources embedded within the connecting panel, wherein each light source of the plurality of light sources is controllable to produces a variety of lighting effects.

14. The tailgate assembly as recited in claim 13, wherein the lighting effects include any combination of letters, numbers, words, phrases, symbols, and/or logos.

15. The tailgate assembly as recited in claim 1, wherein the deployable cargo extender system is an accessory system that is connectable to the door subassembly when the door subassembly is positioned in the door open position.

16. The tailgate assembly as recited in claim 1, wherein the first axis is a horizontally extending axis, and the second axis is a vertically extending axis.

17. A tailgate assembly for a vehicle, comprising:
a frame subassembly;
a door subassembly connected to the frame subassembly;

the frame subassembly and the door subassembly pivotable together between a tailgate closed position and a tailgate open position;
the door subassembly pivotable or slidable relative to the frame subassembly between a door closed position and a door open position; and
a deployable step system integrated as part of the door subassembly, wherein the deployable step system includes a deployable step connected to the door subassembly by a pivot assembly,
wherein the deployable step is pivotable between a stowed position and a deployed position, and further wherein a top side of a handle of the deployable step establishes at least a portion of a corner of the door subassembly in the stowed position and an underside of the handle establishes a step surface in the deployed position.

18. A tailgate assembly for a vehicle, comprising:
a frame subassembly;
a door subassembly connected to the frame subassembly;
the frame subassembly and the door subassembly pivotable together between a tailgate closed position and a tailgate open position;
the door subassembly pivotable or slidable relative to the frame subassembly between a door closed position and a door open position; and
a deployable cargo extender system integrated as part of the door subassembly, wherein the deployable cargo extender system is an accessory system that is connectable to the door subassembly when the door subassembly is positioned in the door open position,
wherein the deployable cargo extender system includes two or more tubes linked together by one or more linkages.

19. The tailgate assembly as recited in claim 18, wherein each tube of the two or more tubes is a telescoping tube received within an opening formed in the door subassembly and is.

20. The tailgate assembly as recited in claim 19, wherein the deployable cargo extender system is movable between a retracted position in which the two or more tubes are retracted and a deployed position in which the two or more tubes are expanded, wherein each tube of the two or more tubes includes an opening configured to receive a striker of the frame subassembly.

\* \* \* \* \*